United States Patent [19]
Kageyama et al.

[11] 3,872,377
[45] Mar. 18, 1975

[54] COLD CATHODE IONIZATION GAUGE

[75] Inventors: Katsuhiro Kageyama; Shinhachi Utsunomiya, both of Yokohama, Japan

[73] Assignee: Tokyo Shibaura Electric Company, Ltd., Kawasaki-shi, Kanagawa-ken, Japan

[22] Filed: Oct. 11, 1972

[21] Appl. No.: 296,531

[52] U.S. Cl. ............................................. 324/33
[51] Int. Cl. .......................................... G01n 27/62
[58] Field of Search ...... 324/33, 28 R; 250/83.6 PS, 250/83.6 P

[56] References Cited
UNITED STATES PATENTS

| 2,197,079 | 4/1940 | Penning | 324/33 |
| 2,993,638 | 7/1961 | Hall et al. | 324/33 X |
| 3,447,072 | 5/1969 | Sheldon | 324/33 |
| 3,575,656 | 4/1971 | Watrous, Jr. | 324/33 |

OTHER PUBLICATIONS

Dushman; Lafferty, Scientific Foundation of Vacuum Techniques, 2nd Edition, John Wiley & Sons, Inc., N.Y., 1962, pp. 350–353.
G. A. Doran, "Ionization Gauge Power Supply for Use in a Pulsed Magnetic Field," Journal of Scientific Instruments, Vol. 38, Sept. 1961, pp. 355–356.

*Primary Examiner*—Alfred E. Smith
*Assistant Examiner*—Rolf Hille
*Attorney, Agent, or Firm*—Oblon, Fisher, Spivak, McClelland & Maier

[57] ABSTRACT

A cold cathode ionization gauge is disclosed and includes means for establishing a temporary high electric field and a magnetic field between an anode and a cathode thereof. The temporary application of a high electric field enables a high accuracy vacuum measurement to be made.

14 Claims, 31 Drawing Figures

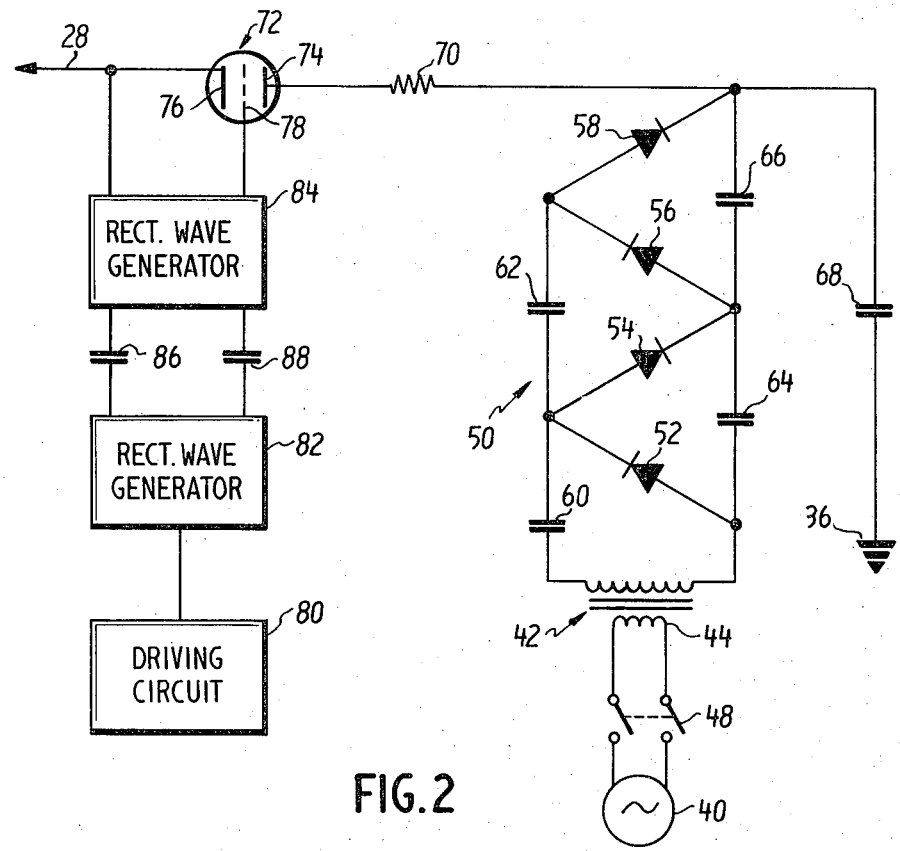
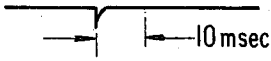
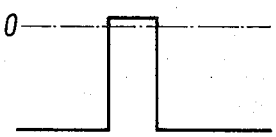
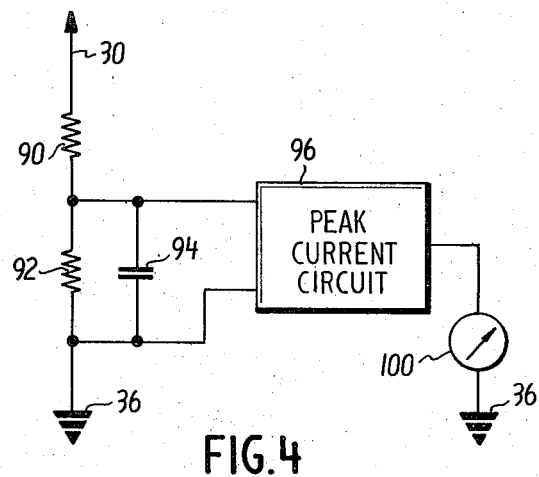

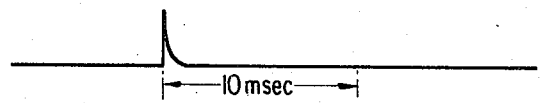
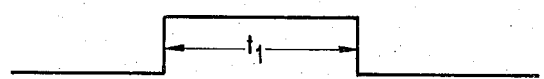
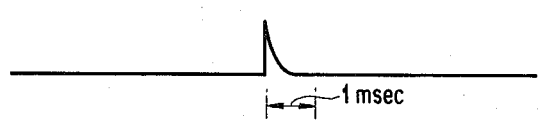
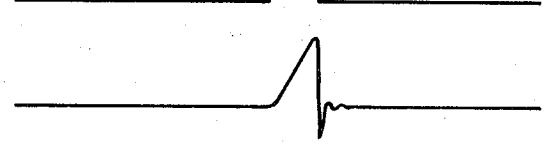
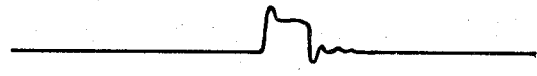
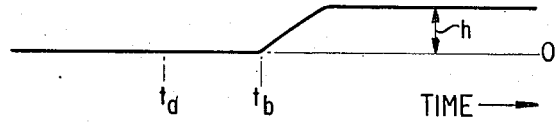
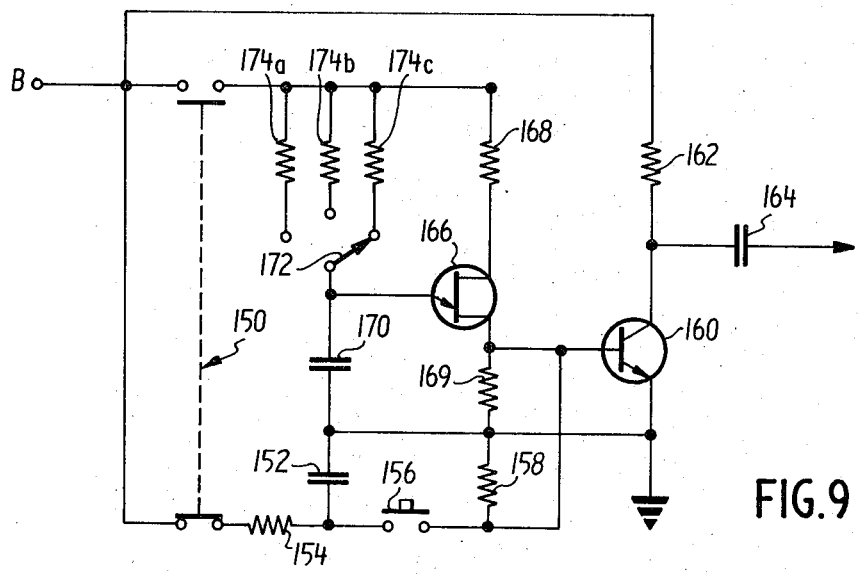

COLD CATHODE IONIZATION GAUGE

BACKGROUND OF THE INVENTION

1. Field of the Invention

The present invention relates to a cold cathode ionization gauge which is capable of making vacuum measurements with high accuracy by suppressing the exhaust action and errosion or contamination caused by a discharge current.

2. Description of the Prior Art

As is well known, cold cathode ionization gauges are generally classified as being of the normal magnetron type, the inverted magnetron type or of the Philips ionization gauge type. Such cold cathode ionization gauges are widely used for making vacuum measurements in industrial fields, since they have characteristics which make them easy to manufacture, easy to operate and endurable for maintaining consistency of air or vapor.

The above referenced coventional gauges have a pair of electrodes in an evacuated non-magnetic envelope. A high D.C. voltage is applied between the electrodes for causing a discharge current to flow therebetween. A magnetic field is applied along the axis of the electrodes in order to maintain the discharge current. The amount of the vacuum of a device connected to the gauge can be obtained by measuring the amount of the discharge current within the gauge.

While somewhat satisfactory, since in such prior art vacuum gauges a high D.C. voltage was continuously applied between the two electrodes thereof in order to maintain the discharge current therebetween the electrodes would become contaminated and corroded by ionized particles. The effect of such contaminated and corroded electrodes would be to prevent a highly accurate vacuum measurement from being realized when the gauge was used for a long and continuous measurement.

Moreover, another problem with the prior art gauges was that an exhaust action would be caused by the ionization of molecules within the gauge envelope and the capturing of the ionized particles by the electrodes. Thus, when the gauges were used for making vacuum measurements of a small vessel, the vacuum would rapidly decrease thereby preventing accurate measurements of the value of the original vacuum to be made. The exhausting action is thought to be similar to the action of an ionization pump. The exhausting rate of an ionization pump is about 1,000cm$^3$/sec and has no relation to its degree of vacuum. For example, when the vacuum of an envelope having a capacity of 1.000 cm$^3$ was measured by a typical prior art gauge, a vacuum value of $1 \times 10^{-4}$ mm Hg was obtained just before the voltage was applied between the electrodes and was $1 \times 10^{-6}$ mm Hg within a few seconds after the voltage was continuously applied.

Thus, a need existed for a high accuracy measurement cold cathode ionization gauge which could be realized only by decreasing the corrosion or contamination of the electrodes and the exhaust action thereof.

SUMMARY OF THE INVENTION

Accordingly, it is an object of the present invention to provide a new and improved unique cold cathode ionization gauge for enabling a decreased exhaust action and contamination or corrosion of the electrodes whereby high accuracy vacuum measurements can be made.

Another object of the present invention is to provide a new and improved unique cold cathode ionization gauge which can be used for long and continuous vacuum measurements.

Still another object of the present invention is to provide a new and improved vacuum gauge for making high accuracy measurements of a vacuum switch.

Briefly, in accordance with this invention, the foregoing and other objects are in one aspect attained by the provision of an evacuated envelope, a pair of electrodes disposed in the envelope, a high voltage pulse generator for supplying a high voltage pulse of limited duration between a magnetic field generating means for applying a magnetic field along the axis of the electrodes, and an indicator for displaying the value of vacuum by measuring the amount of discharge current which flows between the two electrodes.

BRIEF DESCRIPTION OF THE DRAWINGS

Other objects and features of the invention will become apparent to those skilled in the art as the same becomes better understood by reference to the following detailed description when considered in connection with the accompanying drawings, in which:

FIG. 2 is a circuit diagram of a high voltage pulse generator for use in the vacuum gauge of the present invention;

FIGS. 3A and 3E show the current passing through various parts of the apparatus of FIG. 2;

FIG. 4 shows a circuit diagram of a discharge current measurement circuit for use with the vacuum guage of the present invention;

FIGS. 8A through 8I show the current passing through various parts of the apparatus of FIG. 7;

FIG. 9 is a circuit diagram of another trigger pulse generator suitable for use in the embodiment of FIG. 7;

DETAILED DESCRIPTION OF THE PREFERRED EMBODIMENTS

Figure 1:
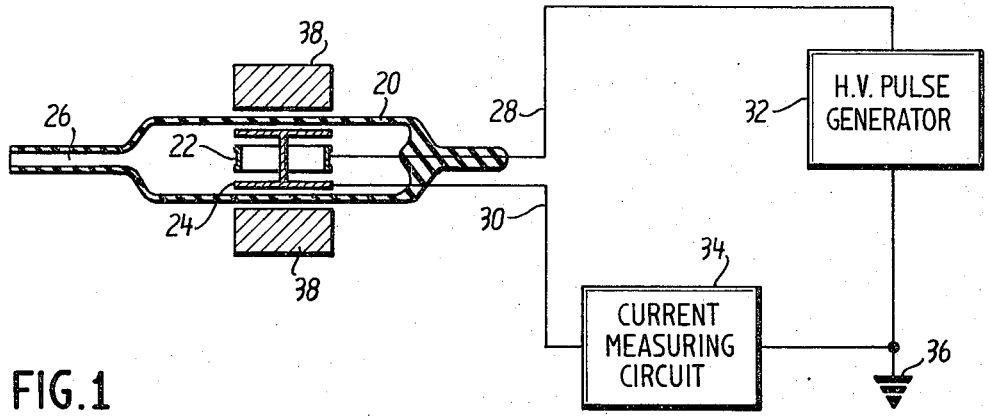
FIG. 1 is a schematic diagram, partly in section, of a preferred embodiment of the present invention.

Referring now to the drawings, wherein like reference numerals indicate identical or corresponding parts throughout the several views and more particularly to FIG. 1 thereof, wherein a preferred embodiment of a cold cathode ionization gauge according to the present invention is shown by way of example as being of the magnetron type. In an evacuated envelope 20 made of a non-magnetic material, such as glass or ceramics, are disposed a ring anode electrode 22 and spoollike cathode 24. An end 26 of the evacuated envelope is connected to a device so as to measure the vacuum therefore, such as a vacuum vessel, not shown in the FIGURE. Hermetically sealed lead wires 28 and 30 are provided and are respectively connected to the anode 22 and the cathode 24. The anode 22 and the cathode 24 are respectively further connected to a positive terminal of a high voltage pulse generator 32 and to a negative terminal of the high voltage pulse generator 32 through a discharge current measuring circut 34. The negative terminal of the high voltage pulse generator is connected to a ground 36. A permanent magnet 38 is disposed so as to apply a magnetic field along an axial direction of the anode 22 and the cathode 24.

A detailed description of the construction and operation of a suitable appartus for the high voltage pulse generator 32 will now be described with reference to FIGS. 2 and 3.

In FIG. 2, an A.C. source 40 is shown as being connected to a primary winding 44 of a transformer 42 through a switch 48. A secondary winding 46 of the transfer 42 is connected to a conventional Cockcroft circuit 50 which consists of diodes 52, 54, 56 and 58 and condensers 60, 62, 64 and 66 and provides a high D.C. voltage. A condenser 68 is connected in parallel to the Crockcoft circuit 50 and the high D.C. voltage will be charged by the condenser 68 and supplied to an anode 74 of a high voltage electronic tube 72 through a protection resistor 70.

On the other hand, a driving circuit 80 is provided and generates a first trigger pulse as is shown in FIG. 3A. The first trigger pulse is supplied to a first rectangular signal generator 82, such for example as a monostable multivibrator comprising two transistors. The rectangular signal generated by the first rectangular signal generator 82 is shown in FIGS. 3B and 3C and is applied as a trigger signal to a second rectangular pulse generator 84 through condensers 86 and 88, as is shown in FIG. 3D. The output voltage of the second rectangular signal generator 84 has a shape as is illustrated in FIG. 3E and is positive for only a limited duration, such as 10 msec, and is of a large negative value for all other times. The output voltage of the second rectangular signal generator 84 is applied between a cathode 76 which is connected to the anode 22 of the vacuum gauge and a grid 78 of the high voltage electronic tube 72. The second rectanguler wave generator 84 will allow the electron tube 72 to be in a conductive state only for the 10 msec positive period thereof. Thus, the high D.C. voltage obtained through the Cockcroft circuit 50 and charged by the condenser 68 will be applied to the anode 22 of the vacuum gauge only for the conducting period of the high voltage electronic tube 72.

With reference now to FIG. 4 a detailed description of the construction and operation of an apparatus suitable for the discharge current measuring circuit 34 of FIG. 1 will now be described. In FIG. 4 resistors 90 and 92 are shown as being connected to the lead wire 30 of the cathode 24 of the vacuum gauge to eliminate any noise component. A bypass condenser 94 is connected in parallel to the resistor 92 to eliminate any high frequency component. A series circuit having a peak current holding circuit 96 and a vacuum indicator 100 is connected between the intermediate connecting point of the resistors 90 and 92 and the ground 36. The high frequency component of the pulselike discharge current is deleted by the filter action of the resistor 92 and the condenser 94, and the maximum value of the discharge current which will flow, for example, for 10 msec. is maintained for a longer time by the peak current holding circuit 96. When the D.C. voltage supplied between the cathode 24 and the anode 22 of the vacuum gauge is for example 10 KV and the period of application is 10 msec., it is possible with the present invention to measure with high accuracy a vacuum even in the range of $10^{-6}$ to $10^{-7}$ mm Hg by measuring the discharge current.

It should now be apparent that the contamination or corrosion of the electrodes caused by the continuous ionization current in the prior art vacuum gauges is substantially suppressed in the cold cathode ionization gauge of the present invention, since a high D.C. voltage pulse is applies between the electrodes only for a short period of time. Furthermore, is should be apparent that with the present invention, any exhaust action will be negligible because of the short time period of operation. This is, for example, the exhausted amount which will occur by one measurement operation with the present invention vacuum gauge is about 10 $cm^3$ for a 10 msec. voltage application. Thus, the decrease of vacuum is substantially negligible.

Figure 5:
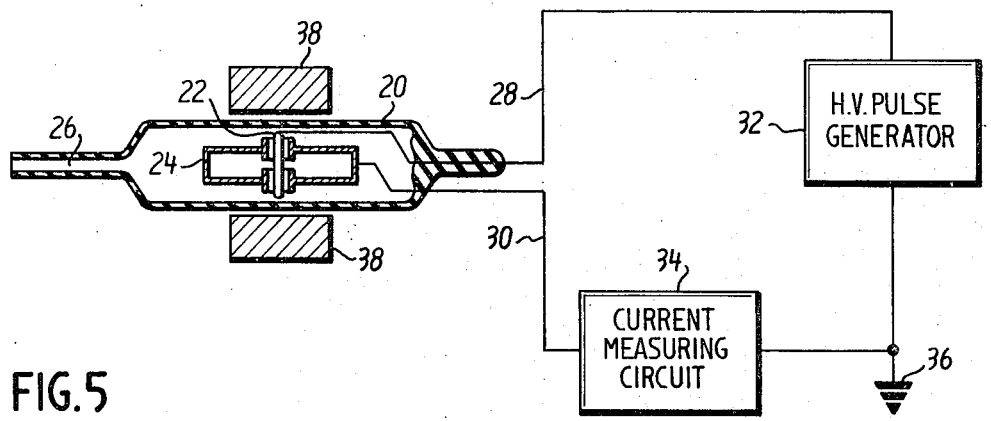
FIGS. 5 and 6, respectively, are schematic diagrams of other preferred embodiments of the present invention.
Figure 6:
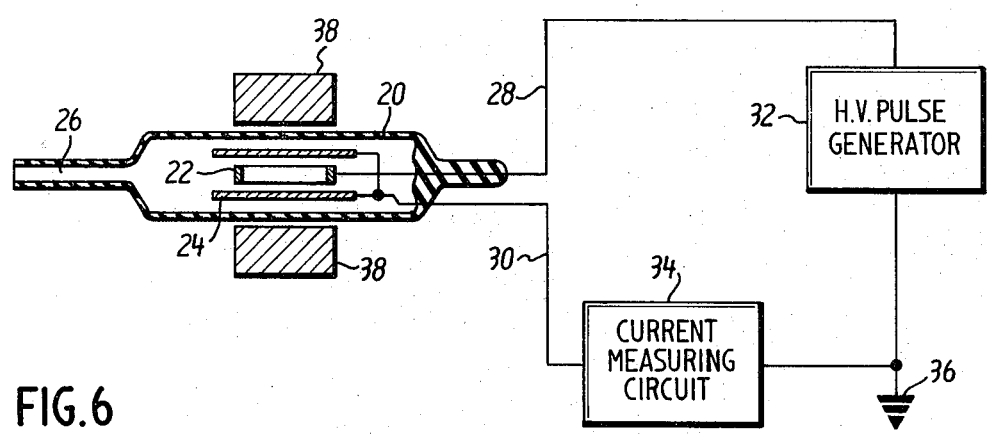

FIGS. 5 and 6 respectively show other and alternative preferred embodiments of the present invention, wherein an inverted magnetron type cold cathode ionization gauge and a Philips ionization gauge are substituted for the normal magnetron type cold cathode ionization gauge of FIG. 1. The gauges of FIGS. 5 and 6 differ from that of FIG. 1 only in the disposition of the electrodes. The circuit arrangement and operation is exactly same and need not be repeated.

It should be understood, however, that the start of the discharge within the gauge after the application of a high D.C. voltage will vary slightly with the kind of vacuum gauge used and its vacuum degree. This can be easily compensated for since the application period of the D.C. voltage can be readily varied by varying the operation time of the multivibrator which works as the first rectangular signal generator 82.

In the abovementioned embodiments, a pulselike high D.C. voltage is applied between the electrodes and a continuous magnetic field is applied by a permanent magnet along the axis of the electrodes. A typical value for the magnetic field used in these vacuum gauges is 1,500 gauss. The permanent magnet required to provide such a magnetic field is very heavy. It should be understood that instead of the continuous magnetic field a pulselike magnetic field can be provided by an electric magnet and applied in synchronization with the application of the pulselike D.C. voltage to cause a discharge within the vacuum gauge. An advantage of the electric magnet is that it is of a light weight compared with that of the permanent magnet and allows the vacuum gauge measuring apparatus to be easily moved.

Figure 7:
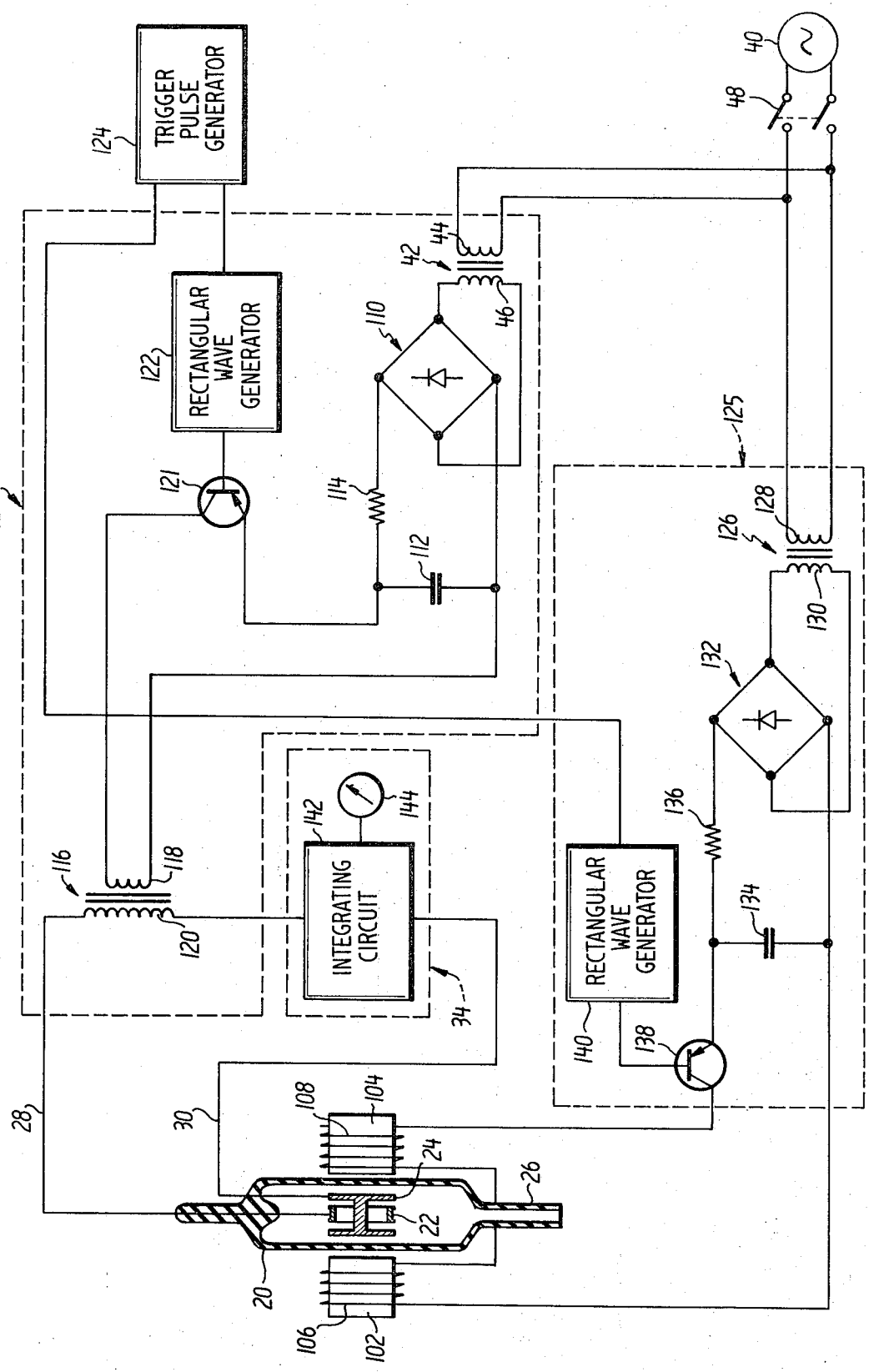
FIG. 7 is a schematic diagram, partly in section, of still another preferred embodiemnt of the present invention.
Figure 10A:
FIGS. 10A through 10E shows the current passing through various parts of the embodiment of FIG. 7 using the trigger pulse generator of FIG. 9.
Figure 10B:
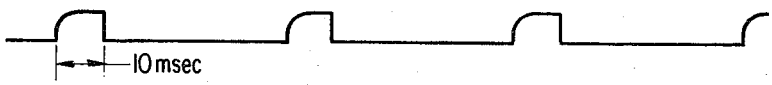
Figure 10C:
Figure 10D:
Figure 10E:
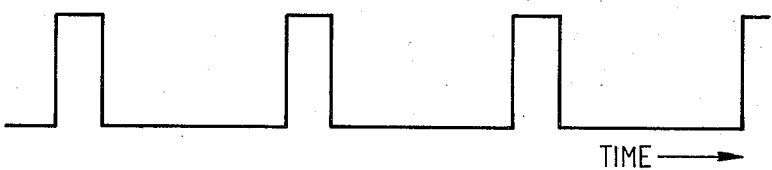

Referring now to FIG. 7 still another embodiment of the present invention is shown which uses a pulse like magnetic field. In FIG. 7 a vacuum envelope 20 is shown as having two electrodes, i.e., anode 22 and cathode 24, disposed therein and an end 26 of the envelope 20 is to be connected to a vacuum vessel or the like in which the vacuum thereof is to be measured. Electric magnets 102 and 104 are provided and are disposed adjacent to the electrodes for applying a magnetic field sufficient to cause a discharge along the axis of the electrodes. Magnetic field coils 106 and 108 are respectively wound on the electric magnets 102 and 104. A primary winding 44 of a first transformer is connected to an A.C. source 40 through a switch 48. A secondary winding 46 of the first transformer 42 is connected to a first full wave rectifier 110 which is made of a diode bridge. A first condenser 112 is connected to the D.C. output terminals of the full wave rectifier 110 through a resistor 114. The charge stored on the condenser 112 is applied to a primary winding 118 of a second transformer 116 through a first high power switching transistor 121 which is controlled by a first rectangular signal generator 122. The first rectangular signal generator 122 is synchronized to the operation of a trigger pulse generator 124 which also controls the application of the pulse magnetic field as described hereinbelow.

A primary winding 128 of a third transformer 126 of a magnetic field pulse generator 125 is connected to the A.C. source 40 through the switch 48. A secondary winding 130 of the third transformer 126 is connected to a second full wave rectifier 132 which is made of a diode bridge. A second condenser 134 is connected to the D.C. output terminals of the full wave rectifier 132 through a resistor 136. The charge stored on the condenser 134 is applied to the magnetic field coils 106 and 108 through a second high power switching transistor 138 which is controlled by a second rectangular signal generator 140 which is also synchronized to the operation of the trigger pulse generator 124.

The discharge current measuring circuit 34 of the present embodiment includes an integrating circuit 142 and an indicator 144 which is connected between the cathode 24 and the secondary winding 120 of the second transformer 116.

The first and second switching transistors 121 and 138 are controlled by supplying a trigger pulse generated by the trigger pulse generator 124 to a respective base electrode of the switching transistors. The high voltage pulse applied between the anode 22 and the cathode 24 of the vacuum guage and the pulse magnetic field should be synchronized so as to supply their maximum values at the same time. It should be understood, however, that the rise time of the pulsed magnetic field differs from that of the electric pulse voltage applied between the electrodes. Accordingly, it should be apparent that the switching pulses for controlling the first and second rectangular signal generators 122 and 140 should be set so as to generate the pulses differently from each other in accordance with the difference of the time constant of their rise times.

The operation of this embodiment will be described more particularly with reference to FIGS. 7 and 8. The first and second condensers 112 and 134 will be charged by the closing of the switch 48. The condensers 112 and 134 will be blocked from discharging because the switching transistors 121 and 138 will be in an off condition. A trigger pulse as shown in FIG. 8A will then be generated at the time $t_a$ by the trigger pulse generator 124. The trigger pulse will be applied to the second rectangular signal generator 140 to thereby generate a rectangular signal having a width $t_1$, such as 10 msec., as is shown in FIG. 8B. The rectangular signal having the width $t_1$, is then applied to the base electrode of the second switching transistor 138 to change it into a conductive state. FIG. 8C shows the discharge current and the current from the rectifier bridge 132 through the second switching transistor 138, and the current which energizes the magnetic field coils 106 and 108 to thereby generate a high magnetic field between the poles of the electric magnets 102 and 104 for 10 msec. The magnetic field generated by the electric magnets is proportional to the current flowing through the magnetic field coils thereof. Thus, the shape of the current illustrated in FIG. 8C is the same as the shape of the magnetic field generated by the current.

Another trigger pulse, as shown in FIG. 8D, is generated at a predetermined time $t_b$ by the trigger pulse generator 124 and the time $t_b$ is determined so that the current of FIG. 8C almost reaches its maximum value. The first rectangular signal generator 122 is triggered by this second pulse and generates a rectangular signal having a width $t_2$, such as of 1 msec., as is shown in FIG. 8E. The rectangular output signal of the first rectangular signal generator 122 changes the first switching transistor 121 into a conductive state.

Accordingly, a discharge current as shown in FIG. 8F will flow through the primary winding 118 of the transformer 116 and a voltage as shown in FIG. 8G, will be induced at the secondary winding 120. Now the magnitude of the combined voltage and magnetic field is large enough to cause a discharge current, as shown in FIG. 8H, to flow between the anode 22 and the cathode 24. The discharge current is integrated by the integrating circuit 142 of the discharge current measuring circuit 34 and a current, as shown in FIG. 8I, will flow through the indicator 144 to display the variation h.

Now it should be understood that when the relation between a vacuum and a displayed value has been previously measured and the indicator is graduated to show a vacuum directly that an unknown vacuum can be easily measured and the value directly obtained from the indicator 144. The period 1 msec., and 10 msec., of the first and second rectangular signals may be typically respectively designed to match with one-third of the time constant of the high voltage transformer 116 and the time constants of the magnetic field coils 106 and 108. The above values are merely exemplary and are not to be construed as a limitation of the present invention.

In the above described embodiment of FIGS. 7 and 8, it should now be apparent that since the electric magnets are very light compared with permanent magnets that the device is easy to carry.

It is desirable that the high accuracy vacuum gauge of the present invention be capable of use for the continuous measurement of a vacuum for a fixed or predetermined interval. Still another preferred embodiment of the present invention is illustrated in FIG. 9 and allows for a single or continuous measurement of a vacuum to be realized for a fixed or predetermined interval. The circuit diagram shown in FIG. 9 shows a modification of the driving circuit 80 shown in FIG. 2, which allows the above object to be realized. The operation of the circuit of FIG. 9 is divided in two ways in accordance with the position of an exchange switch 150. One position provides a circuit for manually generating a pulse when a vacuum is to be measured a single time and the other position provides a circuit for periodically generating pulses when a vacuum is to be measured continuously.

The circuit for allowing a manual operation includes a condenser 152, a resistor 154 and a normally off push button switch 156. If it is assumed that the exchange switch 150 and the push button switch 156 are at the positions illustrated in FIG. 9 then the condenser 152 will be charged by an electric source (not shown) applied at B. Then the push button switch 156 will be closed to cause a discharge current to flow through a resistor 158. The discharge pulse is applied to an inverter circuit which includes a transistor 160, a resistor 162 and a coupling condenser 164 for adjusting the polarity of a trigger pulse with that of the trigger pulse illustrated in FIG. 3A.

On the other hand, when the exchange switch 150 is in a position which is the reverse of the illustrated one, an oscillating circuit which includes a unijunction transistor 166, resistors 168 and 169 and a time constant circuit consisting of a condenser 170, a rotating switch 172 and interval adjusting resistors 174a, 174b and 174c are utilized. The oscillating circuit oscillates with a period which is determined by the time constant circuit as selected.

FIGS. 10A through 10E show the current passing through various portions of the embodiment of FIG. 7 wherein the driving circuit is that as illustrated in FIG. 9 and wherein the same is set so as to be used for making continuous measurements. The measuring time interval is selected to be for example 10 sec. and is obtained by selecting an adequate time interval for the adjusting switch. Since FIGS. 10A through 10E provide the same current as that illustrated in FIGS. 3A through 3E their explanation need not be repeated.

As is described above, a vacuum gauge according to the present invention can be operated continuously with a high accuracy for predetermined time intervals with very small influence due to any exhausting action and corrosion or contamination of the electrodes thereof. Obviously, the present invention would be useful for the normal checking of a vacuum envelope or the like and the same could readily be utilized in connection with a recording device to provide a permanent print-out record of the measured values. It should be understood that the embodiment of FIG. 9 can easily be adapted to the trigger pulse generator 124 of FIG. 7 by using, for example, a multivibrator next to the unijunction transistor and differeniating the output thereof so that the same may generate two trigger pulses having a fixed interval.

It should further be understood that the above-mentioned concept can be applied to the measurement of a vacuum by any device which operates, and is constructed similar to that of the vacuum gauges described above.

Thus, for example, a vacuum switch has a pair of electrodes which are able to make and break contact with each other in a vacuum envelope and is designed in such a fashion that a discharge phenomena will not easily occur. A vacuum switch can therefore be considered to be of a similar structure to the apparatus within the envelope portion 20 of the cold cathode ionization described above. The vacuum of a vacuum switch should be constantly maintained at a low level, for example $1 \times 10^{-5}$ mmHg or less in order to display its usual characteristics. But the vacuum will change because of gas escaping from the material or leakage and the same may eventually cause breakdown of the vacuum switch. It is necessary therefore to periodically check the vacuum of a vacuum switch. In the past, it has been difficult to measure the vacuum of a vacuum switch because of the exhausting action and unstable discharge current of the vacuum switch which had a small envelope or vessel and a hard to discharge construction.

Figure 11:
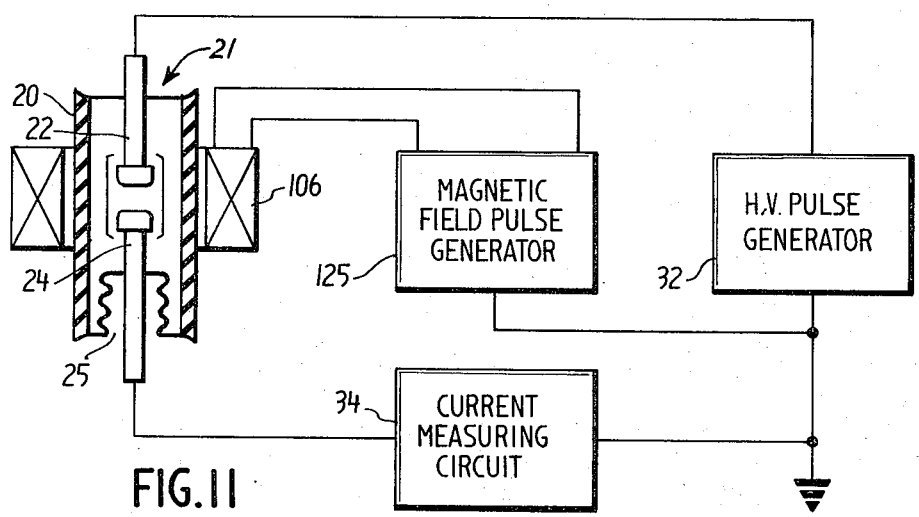
FIG. 11 is a schematic diagram, partly in section, showing still another preferred embodiment of the present invention wherein a conventional vacuum breaker or switch itself is used as an evacuated envelope.

The present invention is also applicable to the measurement of the vacuum of such a vacuum switch and a fairly high pulse voltage and a high magnetic field are desirable for this purpose. FIG. 11 shows a schematic diagram of the present invention as applied to the vacuum measurement of a vacuum switch. In FIG. 11 there is shown a conventional vacuum switch 21 which includes two electrodes 22 and 24 in a vacuum envelope 20. The electrode 24 is designed to be movable along the axis of the vacuum switch by the action of a bellows 25. A high voltage pulse generator 32 and a discharge current measuring circuit 34 are connected to the electrodes 22 and 24 as is shown in FIG. 11. A magnetic field pulse generator 125 is connected to a magnetic field coil 106 which surrounds the vacuum switch in order to generate a magnetic field between the two electrodes 22 and 24. The operation and particulars of the high voltage generator 32, the discharge current measuring circuit 34 and the magnetic field pulse generator 125 may be same as that described hereinbefore.

Figure 12:
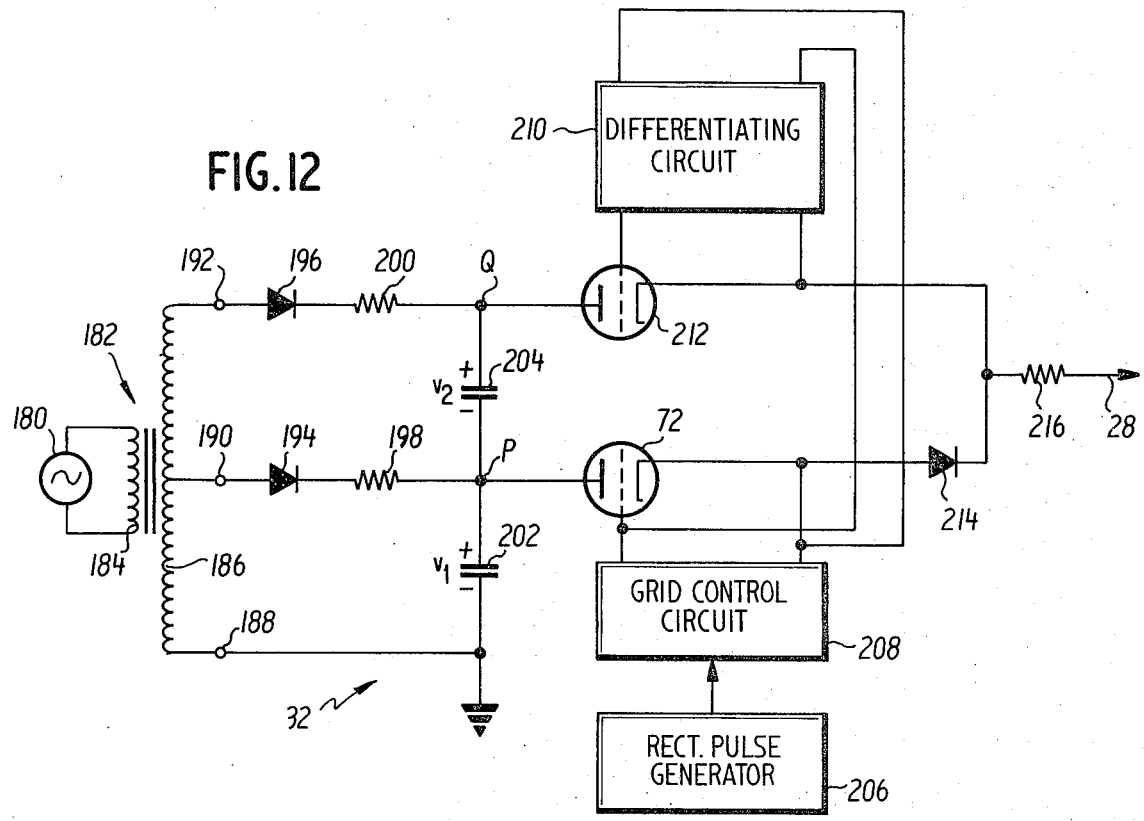
FIG. 12 is a circuit diagram showing another preferred embodiment of a high voltage pulse generator used as an element of the present invention.

For high accuracy measurements it is desirable to make sure that the discharge current reaches a saturation state before a high voltage applied between the two electrodes becomes zero, especially when measuring the vacuum of a vacuum switch being hard to discharge. FIG. 12 shows a high voltage pulse generating circuit used for this purpose and its operation is explained with reference to FIG. 13.

In FIG. 12, an A.C. source 180 is shown as being connected to a primary winding 184 of a transformer 182. The secondary winding 186 of the transformer 182 is seen to have three terminals 188, 190 and 192. A first terminal 188 of the secondary winding 186 is applied to ground and a second terminal 190 of the secondary winding 186 is disposed at an intermediate point thereof. A series circuit consisting of a diode 194, a protection resistor 198 and a condenser 202 is connected between the first terminal 188 and the second terminal 190 as is illustrated in FIG. 12. Another series circuit consisting of a diode 196, a protection resistor 200 and a condenser 204 is connected between the third terminal 192 and a connecting point P of the protection resistor 198 and the condenser 204. The capacitance of the condenser 204 is designed to be smaller than that of the condenser 202. When an A.C. signal is supplied to the high voltage pulse generator 32 through the A.C. source 180, the condensers 202 and 204 will be charged up to respective voltage $V_1$ and $V_2$ which are respectively equal to the maximum voltage value appearing between the first terminal 188 and the second terminal 190 and between the second terminal 190 and the third terminal 192. A current is then supplied to the magnetic field coil 106 of FIG. 11 and a pulse is generated, for controlling the discharge current measuring circuit 34 and the high D.C. voltage generator 32 after the magnetic field energizing current has reached its stable condition, in a manner similar to that described with reference to FIG. 7.

Figure 13A:
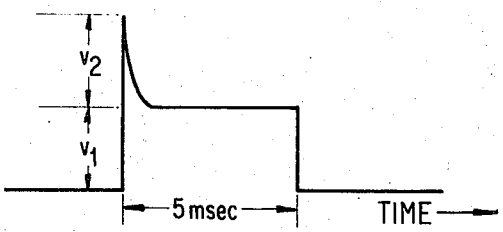
FIGS. 13A and 13B respectively show the voltage and current supplied or passing between the anode and cathode using the high voltage pulse generator of the embodiment shown in FIG. 12.
Figure 13B:
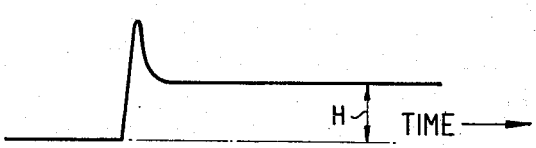

A control pulse from rectangular pulse generator 206 is applied to a grid controlling circuit 208 and the grid controlling circuit 208 provides a grid controlling voltage to the grid electrode of the high voltage vacuum tube 72. The anode of the vacuum tube 72 is connected to the connecting point P of the resistor 198 and the condensers 202 and 204. On the other hand, a grid controlling voltage having a small width and which is synchronized with a control pulse off the grid of the vacuum tube 72 is supplied to the grid electrode of a thyratron 212 through a differentiating circuit 210 to cause the thyratron 212 to be in an on-state. The anode of the thyratron 212 is connected to a connecting point Q of the resistor 200 and the condenser 204. A cathode electrode of the high voltage vacuum tube 72 is connected to a cathode electrode of the thyratron 212 through a diode 214. A high D.C. voltage, as illustrated in FIG. 13A, is applied to the lead wire 28 of the vacuum gauge of this invention through a current limiting resistor 216, while the high voltage vacuum tube 72 and the thyratron 212 are in the on-state. Accordingly, the discharging phenomena will immediately occur between the electrodes of the vacuum switch with the current being as shown in FIG. 13B.

As described hereinbefore, the capacitance of the condenser 204 connected to the anode of the thyratron 212 is very small, so that the thyratron will return to its off-state in a very short period of time. In brief, the voltage $V_1$ is applied between the anode 22 and the cathode 24 after a discharge phenomenon has begun and at this time the discharge will continue for the entire time that the voltage $V_1$ is applied because the magnetic field will have previously reached its saturation value.

It should be understood that the high discharge current which flows at the time of the applying between the electrodes the voltage $V_1$ plus $V_2$ can be suppressed rapidly by adjusting the values of the condensers 202 and 204 and the resistor 216 and accordingly the same will not have any adverse effect on the normal operation of the vacuum gauge of the present invention.

It should now be apparent that the discharging phenomenon of a vacuum switch can readily be caused by momentarily superimposing a high voltage synchronized pulse ($V_2$ of FIG. 13A) with a rectangular pulse ($V_1$ of FIG. 13A).

Figure 14:
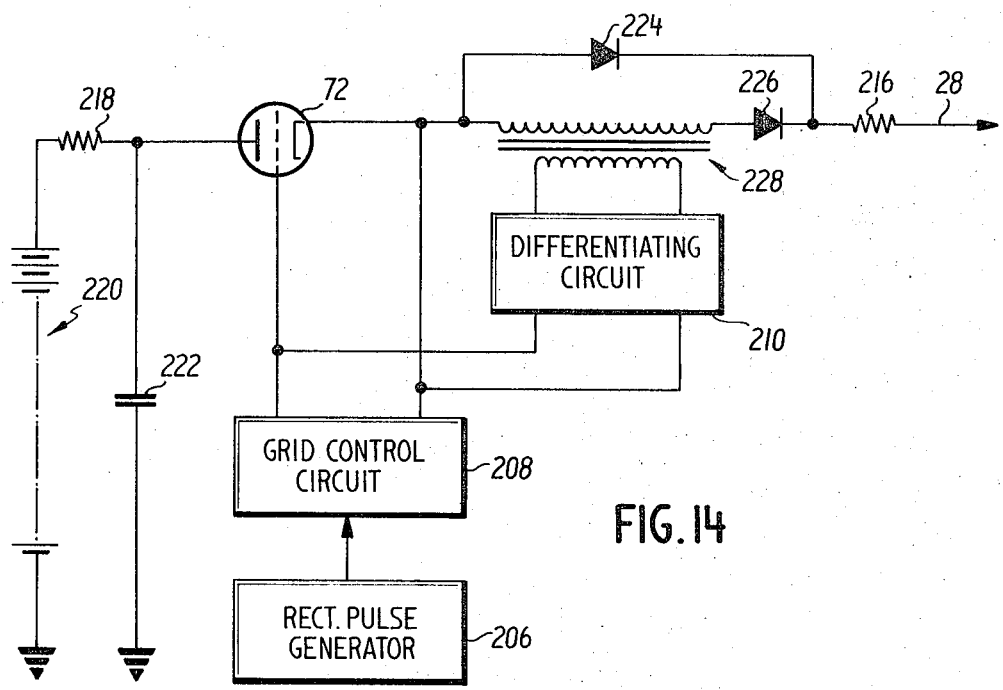
FIG. 14 is a circuit diagram showing still another preferred embodiment of a high voltage pulse generator used as an element of the present invention.

FIG. 14 shows another preferred embodiment of a high voltage pulse generator used for the same object as is disclosed in FIG. 12. In FIG. 14, the positive terminal of a battery 220 is shown as being connected to an anode of a high voltage vacuum tube 72 through a protecting resistor 218 and a storage condenser 222 which is connected between the anode of the vacuum tube and ground. An output signal of a rectangular signal generator 206 is applied to a grid controlling circuit 208 and to a differenciating circuit 210. The high voltage vacuum tube 72 is changed to a conductive state by application of a controlling voltage to the grid thereof. A pulse current flows through a diode 226 and a resistor 216 and a voltage energized by a pulse transformer 228 is synchronized with the application of the grid control voltage which is superimposed through a diode 224.

In this embodiment it is seen that the thyratron in FIG. 12 is substituted with a transformer and a diode.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by letters patent of the United States is:

1. A cold cathode ionization gauge comprising:
   an evacuated envelope;
   a pair of electrodes separately disposed in the envelope;
   a high voltage pulse generator for supplying a high voltage substantially rectangular pulse of a duration of substantially 10 milliseconds between said pair of electrodes;
   a magnetic field generating means for applying a magnetic field along the axis of said pair of electrodes; and
   a discharge current measuring circuit for measuring a discharge current flowing between the pair of electrodes.

2. A cold cathode ionization gauge according to claim 1 wherein said means is a permanent magnet.

3. A cold cathode ionization gauge according to claim 1 wherein said means comprises a magnetic field coil disposed around the evacuated envelope and a magnetic field pulse generator for energizing said magnetic coil.

4. A cold cathode ionization gauge according to claim 1 wherein said high voltage pulse generator supplies one high voltage pulse for each current measurement.

5. A cold cathode ionization gauge according to claim 2, wherein said high voltage pulse generator supplies one high voltage pulse for each current measurement.

6. A cold cathode ionization gauge according to claim 1 further comprising means for energizing said high voltage pulse generator for a fixed time interval.

7. A cold cathode ionization gauge according to claim 2 further comprising means for energizing said high voltage pulse generator for a fixed time interval.

8. A cold cathode ionization gauge according to claim 3 further comprising means for periodically energizing said high voltage pulse generator and said magnetic field pulse generator at approximately the same time.

9. A cold cathode ionization gauge according to claim 3 further comprising means for energizing said magnetic field pulse generator to establish a saturated magnetic field prior to application of said high voltage between said pair of electrodes.

10. Apparatus for testing a vacuum interrupter switch, which comprises:
    a vacuum interrupter switch, which includes:
    an evacuated envelope; and
    a pair of electrodes separately disposed in said envelope; further comprising
    means for supplying a high voltage pulse of a duration in the millisecond region between said pair of electrodes, said means comprising a first rectangular pulse generator and a second pulse generator, said second pulse generator for generating a pulse which is initially and momentarily superimposed with a rectangular pulse from said first pulse generator;

means for supplying a magnetic field along the axis of said pair of electrodes; and a discharge current measuring circuit for measuring a discharge current flowing between said pair of electrodes.

11. The apparatus according to claim 10 wherein said magnetic field means comprises a permanent magnet.

12. The apparatus according to claim 10, wherein said magnetic field means comprises a magnetic field coil disposed around said envelope and a magnetic field pulse generator for energizing said magnetic coil.

13. The apparatus according to claim 12 further comprising means for energizing said magnetic field pulse generator to establish a saturated magnetic field prior to the application of said high voltage between said pair of electrodes.

14. A cold cathode ionization gauge which comprises:

an evacuated envelope;

a pair of electrodes separately disposed in said envelope;

means for supplying a high voltage pulse of a duration in the millisecond region between said pair of electrodes;

a magnetic field coil disposed around said evacuated envelope;

a magnetic field pulse generator for energizing said magnetic coil to create a magnetic field along the axis of said pair of electrodes;

means for synchronizing said high voltage pulse supply means with said magnetic field pulse generator to supply their maximum values to said electrodes and said magnetic coil, respectively, at approximately the same time; and means for measuring a discharge current flowing between said pair of electrodes.

* * * * *